United States Patent
Keider

(10) Patent No.: US 8,867,729 B2
(45) Date of Patent: Oct. 21, 2014

(54) SYSTEM AND METHOD FOR A COMPUTERIZED HELPDESK

(75) Inventor: Boaz Keider, Hod Hasharon (IL)

(73) Assignee: Michlol Services Application Ltd., Herzeliya Pituach (IL)

(*) Notice: Subject to any disclaimer, the term of this patent is extended or adjusted under 35 U.S.C. 154(b) by 1759 days.

(21) Appl. No.: 12/259,304

(22) Filed: Oct. 28, 2008

(65) Prior Publication Data

US 2010/0061543 A1    Mar. 11, 2010

Related U.S. Application Data

(60) Provisional application No. 61/095,976, filed on Sep. 11, 2008.

(51) Int. Cl.
| | | |
|---|---|---|
| *H04M 3/00* | (2006.01) | |
| *G06Q 10/10* | (2012.01) | |
| *H04M 3/51* | (2006.01) | |

(52) U.S. Cl.
CPC .......... *G06Q 10/10* (2013.01); *H04M 3/5191* (2013.01)
USPC ................................ 379/265.09; 379/265.01

(58) Field of Classification Search
CPC ..... H04M 3/5175; H04M 3/523; H04M 3/51; H04M 3/5191; H04M 3/5166; H04M 3/5183
USPC ........................................ 379/265.02, 265.09
See application file for complete search history.

(56) References Cited

U.S. PATENT DOCUMENTS

| | | | | |
|---|---|---|---|---|
| 5,943,652 A | * | 8/1999 | Sisley et al. ................... | 705/7.25 |
| 2002/0087548 A1 | * | 7/2002 | Tasalloti ......................... | 707/10 |
| 2009/0294469 A1 | * | 12/2009 | Poulain et al. .................... | 222/1 |
| 2009/0310764 A1 | * | 12/2009 | Gerhart ..................... | 379/142.04 |
| 2010/0085900 A1 | * | 4/2010 | Stenman et al. .............. | 370/259 |

* cited by examiner

*Primary Examiner* — Rasha Al Aubaidi
(74) *Attorney, Agent, or Firm* — Mark M. Friedman

(57) ABSTRACT

It is disclosed a system for providing a help desk service to several facilities of various organizations. The system includes a computer network interface, a management unit and a cellular network interface. The computer network interface receives service calls from web browsers operated by users at the facilities, and conveys the service calls to the management unit. The management unit receives service calls originated at a communications channel such as the computer network interfacing the computer network interface, identifies individuals associated with handling the service calls, and outputs messages associated with handling the service calls, and identification of the individuals. The cellular network interface receives the messages and the respective identification of the individuals, and uses SMS to submit the messages to the respective individuals.

12 Claims, 2 Drawing Sheets

SYSTEM AND METHOD FOR A COMPUTERIZED HELPDESK

CROSS-REFERENCE TO RELATED APPLICATIONS

This application claims the benefit of provisional patent application Ser. No. 61/095,976 filed Sep. 11, 2008 by the present inventor.

BACKGROUND OF THE INVENTION

1. Field of the Invention

The present invention relates to management of help desks, and in particular to a system which uses available communications channels for computerized system of help desk serving several facilities.

2. Description of Related Art

Organizations have missions which are the reason for their existence, workers to achieve these missions, systems, stocks, equipment, as well as facilities to host all of the above. Maintaining the facilities and the workers ability to function necessitates a team to provide a great variety of services which are not part of the organization core business. For example, an accounting firm needs printer paper, ink, fixing of broken fax machine, moving of tables and storage cabinets, etc. Usually, each service may be handled by a single handyman or a team of two-three handymen, part of which are non-professional workers while part are technical experts or technicians. For efficient operation of the organization there is a need to provide those services with as small as possible attention of workers and management, allowing them to concentrate on the core activities of the organization.

The team of workers providing those services should be kept small as it does not contribute to core activities of the organization. On the other hand, the team should include the handymen needed to comply with the service needs in a timely manner. To achieve both goals, organizations are using a service help desk. The help desk is a center for receiving service calls, deciding which worker takes care of each service call and ordering the appropriate worker or workers to execute the necessary actions. The help desk saves time of works and management as no effort is needed to identify the right person in the organization to talk with about the service call. Also, the handymen are centrally managed, enabling efficient use of their time and specialization of certain workers in specific tasks for the whole facility or organization.

Help desk may be operated as "in house" service that the organization provides either separately for each facility, or for all the facilities of the organization, or at least for those facilities close enough to be served by the same help desk and/or same handyman team. Rather than having an "in house" help desk, an organization may outsource help desk services to an external company. Such a step removes help desk management out of the duties of the organization leadership, allowing more time and attention for dealing with the core business of the organization. Furthermore, the external service company may be organized on geographical basis, selling help desk services to several facilities of several organizations. Thus, it may serve several facilities of different organizations which are closely located, in a single industrial zone, for example. In such a location the service company may have quite a large workforce or handyman team, and thus be cost effective much more than the separate service department of each facility. In particular, separate facilities may have no enough activity to justify hiring a special technician for certain relatively rare service. In contrast, such a technician of the service company serves several facilities, and thus his employment becomes economically feasible.

Another advancement in the field of help desk is partial or full computerization of the help desk wherein a computer software functions as a help desk manager to at least some extent. A computerized in house help desk may be provided as a sub-system of a complex system for computerization of all the administrative and managerial activities of the organization, SAP™ for example. In such a case, the complex system may authorize users to make monetary commitments on behalf of the organization, and therefore security demands allow installation of the complex system on only part of the personal computers which serve employees. Moreover, due to the security demands the installation itself is a time consuming process necessitating time and attention. Besides, once installed, the system allows a worker to issue a service call only from her computer.

Referring to communicating with handymen, the communication channel to an handyman is usually by cellular phone calls. However, the handyman is usually in the field working on a former service call. Immediate response to a phone call may disturb his work, while retrieving a reserved message and returning a call may be a waste of his time.

Thus, there is a need to for a simple and friendly system for help desk management, allowing a user easy approach for issuing a service call and enabling convenient approach to handymen.

BRIEF SUMMARY OF THE INVENTION

It is disclosed for the first time a system for providing a help desk service to several facilities of various organizations. The system includes a computer network interface, a management unit and a cellular network interface. The computer network interface receives service calls from web browsers operated by users at the facilities, and conveys the service calls to the management unit. The management unit receives service calls originated at a communications channel such as the computer network interfacing the computer network interface, identifies individuals associated with handling the service calls, and outputs messages associated with handling the service calls as well as respective identification of the individuals. The cellular network interface receives the messages and the respective identification of the individuals, and uses short message service (SMS) to submit the messages to the respective individuals.

The system may provide a help desk service to facilities served by different handyman teams. Being different teams means that at least one handyman of a team serves one of the facilities but not another facility. Also, the system may provide the help desk service to organizations owned by different owners.

The web browser may be installed in one of a variety of computerized devices, a personal computer, a portable media device, a personal digital assistant device, and a cellular phone, for example.

The computer network interface may interface a variety of computer networks, an intranet network, a virtual private network and the Internet, for example.

The individuals associated with handling the service call may be a handyman, a handyman supervisor, both the handyman and his supervisor, or a representative of a service company.

In some embodiments the management unit is able to receive service calls from additional channels. Exemplary channels are an audio phone channel, a SMS over a cellular network, an electronic mail system and a face to face contact.

In some embodiments, the management unit may send messages associated with handling service calls by interfacing with additional communications channels. Exemplary channels are an audio phone channel, an electronic mail system, and a face to face contact.

In some embodiments the individuals are using SMS to keep the management unit informed on actions they have undertaken in handling the service calls. Consequently, the management unit delivers to users updates on those actions which have been undertaken in handling service calls they have initiated.

In some embodiments the system further includes a personnel database associating service call types with the facilities and with the individuals. The personnel database facilitates the identification of the individuals associated with handling the service calls at the facilities.

In some embodiments the system further includes an event database which stores and retrieves service calls, and for each service call stores updates on actions undertaken in handling the service call, including an update on closing the service call.

In some embodiments the system further includes a preventive maintenance module. The module receives preventive maintenance data associated with instrumentation systems residing at the facilities. At appropriate time the module issues a service call to the management unit according to the maintenance schedule of the instrumentation systems. The management unit receives the issued service call, routes it to the respective individuals, and gets updates on actions undertaken in handling the issued service call. It also submits the updates to a preventive maintenance manager and sends an update on service call closing to the preventive maintenance module, whereas that update is stored as part of the preventive maintenance data.

It is provided for the first time a method for providing a help desk service to users at several facilities of a variety of organizations. First, the users are using a web browser for registering to the help desk service. The next steps are initiating by users of service calls using a web browser, identifying individuals associated to the handling of the service calls, and sending a SMS message to the identified individuals regarding handling of the service calls.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

Figure 1:
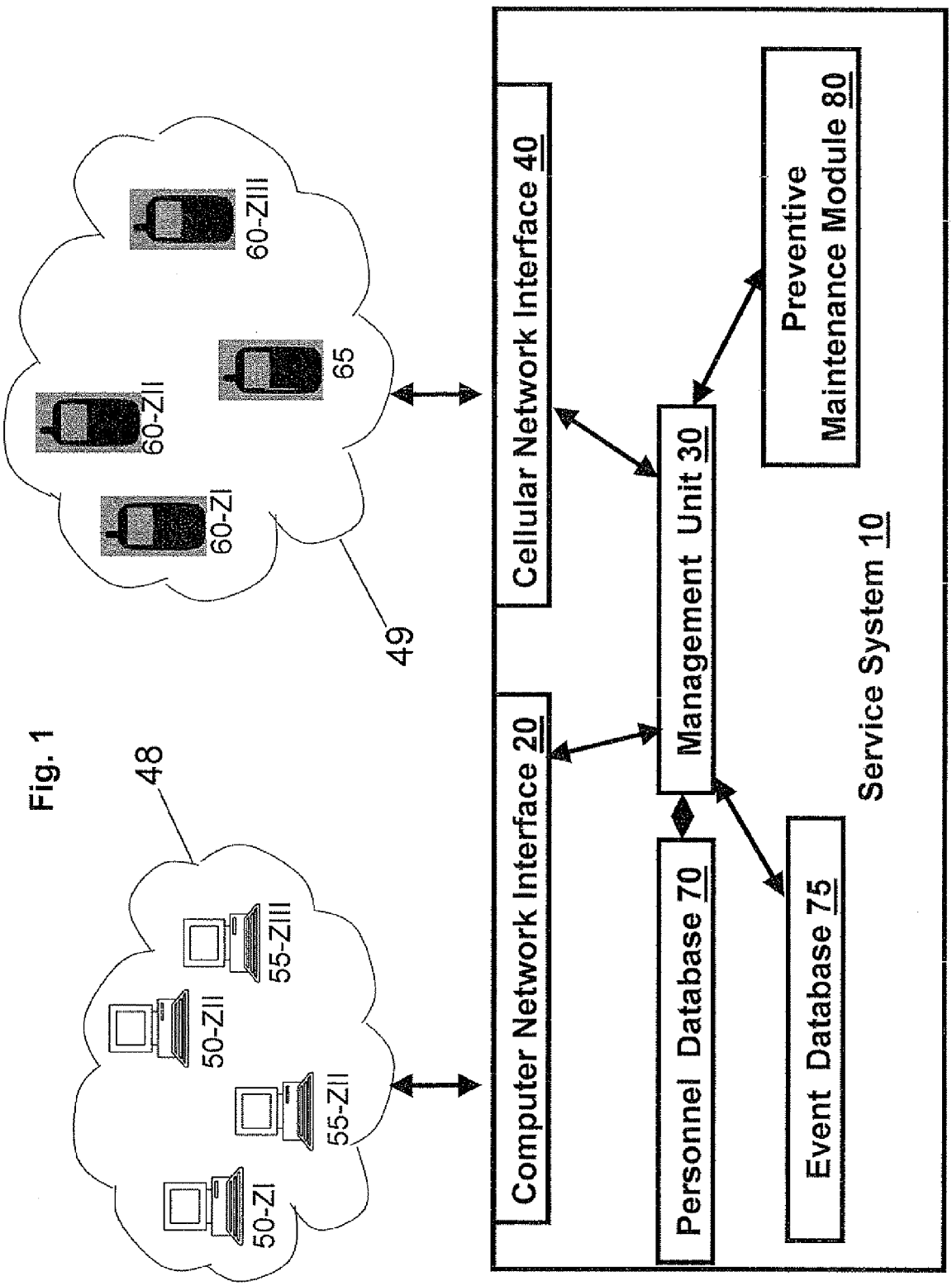
FIG. 1 is a block diagram of a system for providing a help desk service to several facilities of various organizations.

The present invention will now be described in terms of specific example embodiments. It is to be understood that the invention is not limited to the example embodiments disclosed. It should also be understood that not every feature of the methods and systems handling the described help desk is necessary to implement the invention as claimed in any particular one of the appended claims. Various elements and features of devices are described to fully enable the invention.

It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

One preferred embodiment of a service system 10 for providing a help desk service to several facilities of various organizations is shown in the block diagram of FIG. 1. The system 10 includes a computer network interface 20, a management unit 30 and a cellular network interface 40. The computer network interface 20 receives service calls from web browsers operated by users 50-ZI, 50-ZII, 55-ZII, and 55-ZIII who work at the facilities and have personal computers connected to a network 48. The users conveys the service calls to the management unit 30. The management unit 30 receives service calls from a computer network 48 interfacing the computer network interface 20, identifies individuals associated with handling the service calls, and outputs messages associated with handling the service calls, and identification of the individuals. The cellular network interface 40 receives the messages and the respective identification of the individuals, and uses SMS to submit the messages to the cellular phones of the respective individuals 60-ZI, 60-ZII, 60-ZIII, and 65, who utilize cellular phones in a cellular network 49.

For example, user 55-ZII may encounter a service problem at 9:00 once he entered his office, but has to leave the office immediately to go to the president office for a conference. Then, he takes advantage of a five minutes break within the conference to enter the computer of the president's secretary, to browse to the service system, to login and to submit a service call. On the other hand, handyman 60-ZII while being busy in the field taking care of a first service call, receives a SMS message to handle the service call, feeling it by a vibration of the cellular phone, which does not interfere his current task. Once he has closed the first call, he submits a closing update SMS message to the management unit and looks at received SMS messages for the next service calls to take care of, the first call may be an order to handle the service call initiated by user 55-ZII.

For example only, the service system 10 is operated by a service company SERVING-ALL which provides a help desk service to two organizations. The first organization is a governmental agency ABC with two facilities, a first facility at Zone I and a second facility at Zone II. The second organization is an enterprise XYZ having a first facility in Zone II and a second facility in Zone III. Suppose that five service calls have been sent regarding service needed for laser printers. The first four calls are all for absent ink in the printers used by users 50-ZI, 50-ZII, 55-II, and 55-ZIII, who have initiated the service calls. User 50-ZI is an ABC civil servant working in the facility of Zone-I, user 50-ZII is also a civil servant working also in the governmental agency ABC but at Zone-II, user 55-ZII is a XYZ worker in the facility of Zone-II, and 55-ZIII is also an enterprise worker who works in the facility of Zone-III. The management unit identifies that the individuals 60-ZI, 60-ZII, 60-ZIII may handle the service calls for ink. Specifically, individual handyman 60-ZII may first provide ink to the printer of user 50-ZII and then provide ink to the printer of user 55-ZII. The two facilities are close to each other and even though they have different ownership, handyman 60-ZII as an employee of SERVING-ALL can provide ink to the both facilities within reasonable service time of one hour. Thus, the management unit 30 submits an appropriate SMS message using the cellular network interface 40 to handymen 60-ZI, 60-ZII, 60-ZIII.

The fifth service call is for fixing a printer of maker DEFG. The management team identifies that such a service should be given by a DEFG technician and submits appropriate message to representative 65 of DEFG whose responsibility is to take care of the clients of SERVING-ALL, at both Zones I, II and III.

Thus, the system 10 may provide a help desk service to facilities served by different handyman teams. Being different teams means that at least one handyman of a team serves one of the facilities but not an another facility. In the above example, handyman 60-ZI serves only ABC facility at Zone I but not ABC facility at Zone II.

In some embodiments the system 10 is operated by an administrative department of an organization, serving the workers of the organization at one or more facilities.

The web browser may be installed in a variety of computerized devices, a personal computer, a portable media device, a personal digital assistant (PDA) device, and a cellular phone, for example. An appropriate interface for a cellular phone or PDA may be WAP (wireless application protocol).

The computer network interface may interface a variety of computer networks, an intranet network, a virtual private network (VPN) and the Internet, for example.

The individuals associated with handling the service call may be a handyman, a handyman supervisor, both the handyman and his supervisor, or a representative of a service company.

In some embodiments the management unit is able to receive service calls from additional channels. Exemplary channels are an audio phone channel, a SMS over a cellular network, an electronic mail system and a face to face contact.

In some embodiments, the management unit 30 may send messages associated with handling service calls by interfacing with additional communications channels. Exemplary channels are an audio phone channel, an electronic mail system, and a face to face contact.

In some embodiments, the individuals are using SMS to keep the management unit 30 informed on actions they have undertaken in handling the service calls. For example, the handyman may send an update that he have sent a purchase order for a part needed for handling the service call and a time estimate on the time duration needed for handling. Consequently, the management unit 30 sends that update to the user who has initiated the service call.

In some embodiments, the system 10 further includes a personnel database 70 associating service call types with the facilities and with the individuals. The personnel database 70 facilitates the identification of the individuals associated with handling the service calls.

In some embodiments, the system 10 further includes an event database 75 which stores and retrieves service calls. For each service call the event database 75 updates the management unit 30 on actions undertaken in handling the service call as well as an update on closing the service call.

In some embodiments, the system 10 further includes a preventive maintenance module 80. Module 80 receives preventive maintenance data associated with instrumentation systems residing at the facilities. An exemplary instrumentation system is an air-condition system with an air filter to be checked every three months for cleanliness, need to be replaced, etc. At the first Monday of every January, April, July and October module 80 issues service call to the management unit 30. The management unit 30 receives an issued service call, routes it to the respective individuals, and gets updates on actions undertaken in handling the issued service calls. It also submits the updates to a preventive maintenance manager and sends an update on service call closing back to the preventive maintenance module 80, whereas that update is stored as part of the preventive maintenance data.

Figure 2:
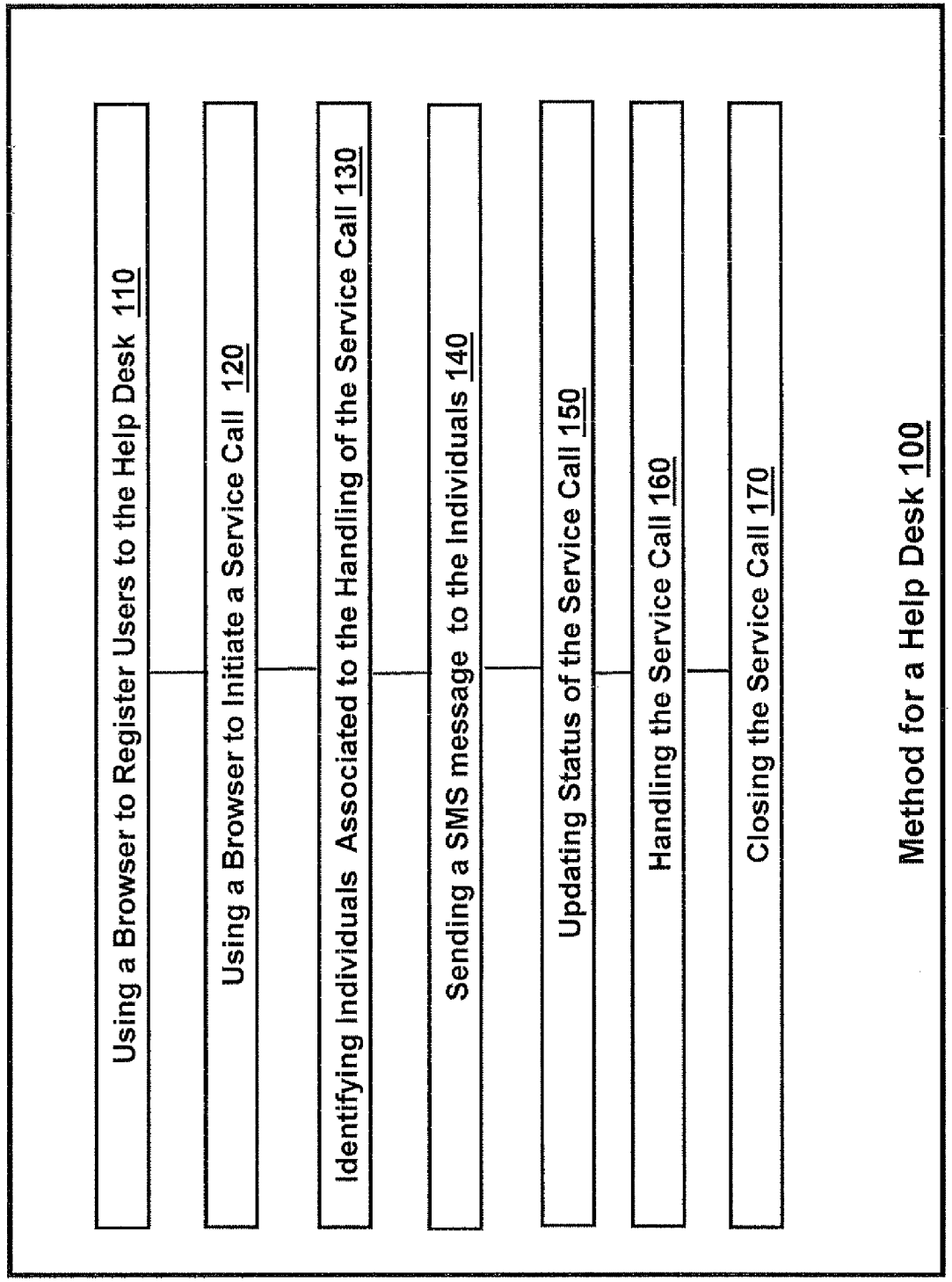
FIG. 2 is a flow chart of a method for providing a help desk service to several facilities of various organizations.

Referring now to FIG. 2, the figure presents a flowchart of a method 100 for providing a help desk service to users at several facilities of a variety of organizations. First, users are using 110 a browser to register to the help desk. Once they have registered, presumably getting a user name and a password, the users may use 120 any browser, not necessarily in their personal computer or PDA to initiate service calls. The next step is identifying 130 individuals associated to the handling of the service calls, and then sending 140 a SMS message regarding handling of the service calls to the identified individuals. During handling of a service call the status is updated 150. After handling 160 the service call, the service call is closed 170.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A system for providing a help desk service to one or more facilities of one or more organizations, said system comprising:
   (a) a computer network interface configured for
      (i) receiving at least one service call from a web browser operated by a user at one facility of said one or more facilities of said one or more organizations; and
      (ii) conveying said at least one service call to a management unit;
   (b) said management unit configured for:
      (i) receiving at least one service call originated in at least one communication channel, said at least one communication channel including at least one computer network interfacing said computer network interface;
      (ii) identifying at least one individual associated with handling said at least one service call; and
      (iii) outputting at least one message associated with handling said at least one service call, and at least one identification of said at least one individual;
   and
   (c) a cellular network interface configured for:
      (i) receiving from said management unit at least one message associated with handling said at least one service call, and at least one respective identification of said at least one individual; and
      (ii) using short message service to submit said at least one message to the respective at least one individual; and (d) a preventive maintenance module operative for:
  (A) receiving preventive maintenance data associated with instrumentation systems residing at one or more of the facilities; and
  (B) issuing service calls in accordance with said preventive maintenance data;
wherein
said management unit receiving an issued service call, routing it to individuals associated with handling said issued service call, getting updates on actions undertaken in handling said issued service call, submitting said updates to a preventive maintenance manager and sending updates on service call closing back to the preventive maintenance module, the closing update becoming part of said preventive maintenance data.

2. The system of claim 1 wherein the system provides a help desk service to at least two facilities served by at least two different handyman teams, the difference between the at least two handyman teams is that at least one handyman of a team serves a first facility of said at least two facilities and not the second facility thereof.

3. The system of claim 1 wherein the system provides a help desk service to at least two organizations owned by at least two different ownerships.

4. The system of claim 1 wherein said web browser is installed in one device of a group consisting of a personal computer, a portable media device, a personal digital assistant device, and a cellular phone.

5. The system of claim 1 wherein the computer network interface is interfacing with at least one of an intranet network, a virtual private network and the Internet.

6. The system of claim 1 wherein an individual of said at least one individual associated with handling said service call is one of a handyman, a handyman supervisor, and a representative of a service company.

7. The system of claim 1 wherein said management unit is able to receive service calls using at least one additional channel of a channel group consisting of an audio phone channel, a short message service over a cellular network, an electronic mail system and a face to face contact.

8. The system of claim 1 wherein said management unit sends at least one message associated with handling at least one service call by interfacing with at least one communication channel of an audio phone channel, an electronic mail system, and a face to face contact.

9. The system of claim 1 wherein said at least one individual associated with handling said at least one service call uses short message service to keep the system informed on actions undertaken in handling service calls routed to said individuals.

10. The system of claim 1 wherein the management unit keeps users informed on actions undertaken in handling service calls initiated by said users.

11. The system of claim 1 wherein the system further includes a personnel database associating service call types with said facilities and with said individuals, wherein said personnel database facilitates said identifying at least one individual associated with handling said at least one service call.

12. The system of claim 1 wherein the system further includes an event database operative for storing and retrieving at least one of:
  (A) a service call;
  (B) an update on actions undertaken in handling said service call; and
  (C) an update on closing said service call.

* * * * *